United States Patent [19]

Kondo et al.

[11] Patent Number: 4,639,491

[45] Date of Patent: Jan. 27, 1987

[54] DISPERSION STABILIZER FOR WATER-IN-OIL SUSPENSION POLYMERIZATION

[75] Inventors: Akihiro Kondo; Rikio Tsushima; Yuzo Sumida, all of Wakayama, Japan

[73] Assignee: Kao Corporation, Tokyo, Japan

[21] Appl. No.: 808,415

[22] Filed: Dec. 12, 1985

[30] Foreign Application Priority Data

Dec. 28, 1984 [JP] Japan .................................. 59-276416

[51] Int. Cl.$^4$ ............................................... C08F 2/32
[52] U.S. Cl. ..................................... 524/801; 523/337
[58] Field of Search ......................... 524/801; 523/337; 525/293

[56] References Cited

U.S. PATENT DOCUMENTS

| | | | |
|---|---|---|---|
| 3,920,599 | 11/1975 | Hurlock | 524/801 |
| 4,330,450 | 5/1982 | Lipowski | 524/801 |
| 4,439,580 | 3/1984 | Schaper | 524/801 |
| 4,464,508 | 8/1984 | Easterly | 524/801 |

*Primary Examiner*—Paul R. Michl
*Attorney, Agent, or Firm*—Flynn, Thiel, Boutell & Tanis

[57] ABSTRACT

A dispersion for the water-in-oil suspension polymerization is stabilized by a stabilizer comprising a polymer having 70 to 99 mole percent of a lipophilic, ethylenically unsaturated monomer units and 1 to 30 mole percent of ethylenically unsaturated monomer units having a cationic group.

7 Claims, No Drawings

DISPERSION STABILIZER FOR WATER-IN-OIL SUSPENSION POLYMERIZATION

The invention relates to a process for the suspension polymerization in the water-in-oil system, a dispersion stabilizer, or a dispersant, and a dispersion for the polymerization. It also provides an improvement in the water-in-oil suspension polymerization of a water-soluble, ethylenically unsaturated monomer. The dispersant comprises a polymer having lipophilic, ethylenically unsaturated monomer units and ethylenically unsaturated monomer units having a cationic group.

STATEMENT OF PRIOR ARTS

It is known that a water-soluble, ethylenically unsaturated monomer is polymerized in an organic solvent in the presence of a dispersant to form a polymer thereof in the form of spherical particles. A solvent to use in the polymerization is not miscible with water or is partially miscible with water. The function of the dispersant is to maintain the monomer to be polymerized in a dispersed state, to inhibit or reduce the tendency of agglomeration of the polymer particles and to adjust the particle size.

As a dispersant to use in the water-in-oil suspension polymerization of a water-soluble, ethylenically unsaturated monomer, there are known nonionic surface active agents such as sorbitan esters, e.g., sorbitan monostearate and sorbitan monooleate, ethoxylated fatty acid amides, and glycerol fatty acid esters. Another type of the known dispersant includes polymeric compounds such as a reaction product between maleic anhydride and an allyl-having resin, a carboxyl group-containing polymer having a compatibility with an organic solvent, and a lipophilic cellulose derivative.

When a dispersant of the former type is used, the polymer is obtained in the form of very fine particles, and dusting is caused at the separating and drying steps and handling of the formed polymer is very difficult. When a dispersant of the latter type is used, the polymer is obtained in the form of small granules and the above shown defect is eliminated, but the polymer particles adhere to the wall of the polymerization vessel and the stirrer during the polymerization operation and a considerable proportion of the feed monomer is inevitably lost as the substance adhering to the polymerization vessel, that cannot be used at all. Under a normal situation, it is difficult to remove away matters adhering on a polymerization vessel, which come from the monomer, and therefore the operation required to remove the adhering matters disturbs the manufacturing of a polymer.

It is a primary object of the present invention to provide a dispersant in which the above-mentioned defects of known dispersants heretofore used in the oil suspension polymerization are overcome.

As the result of our research, it was found that a polymer comprising as indispensable constituents units of a lipophilic, ethylenically unsaturated monomer and units of an ethylenically unsaturated monomer having a cationic group and a specific chemical structure is valuable as the above dispersant. We have now completed the present invention based on this finding.

The invention provides a process for conducting polymerization in the water-in-oil system in the presence of a dispersion stabilizer which comprises a polymer having 70 to 99 mole percent of a lipophilic, ethylenically unsaturated monomer units and 1 to 30 mole percent of ethylenically unsaturated monomer units having a cationic group.

The invention further provides a dispersion for the water-in-oil suspension polymerization which comprises a water-soluble, ethylenically unsaturated monomer, an organic solvent and a dispersion stabilizer comprising a polymer having 70 to 99 mole percent of a lipophilic, ethylenically unsaturated monomer units and 1 to 30 mole percent of ethylenically unsaturated monomer units having a cationic group.

The invention also relates to the above mentioned dispersant.

As the units of the lipophilic, ethylenically unsaturated monomer, there can be mentioned units of styrene, an alkyl-substituted styrene (the alkyl group having 1 to 18 carbon atoms), an alkyl ester of (meth)acrylic acid (the alkyl group having 1 to 18 carbon atoms), a vinyl alcohol ester of a fatty acid (the fatty acid having 2 to 18 carbon atoms) and an N-alkyl(meth)acrylamide (the alkyl group having 1 to 18 carbon atoms).

As the units of the ethylenically unsaturated monomer having a cationic group, there can be mentioned units of cationic group-containing, ethylenically unsaturated monomers represented by the following general formula:

wherein $R_1$, $R_2$ and $R_3$, which may be the same or different, each stands for an unsubstituted or substituted alkyl group having 1 to 18 carbon atoms, or two of $R_1$, $R_2$ and $R_3$ may be bonded to form a heterocyclic ring such as a pyridyl or imidazolyl group, or a cycloalkyl group or heterocycloalkyl group together with the adjacent nitrogen atom, and Y stands for a halogen atom or an acid residue.

The cationic group-having, ethylenically unsaturated monomer units can be introduced into the polymer by a conventional method such as a co-polymerization and a chemical modification of a basic polymer. Practical embodiments are illustrated below.

(a) A monovinylpyridine such as vinylpyridine, 2-methyl-5-vinylpyridine or 2-ethyl-5-vinylpyridine, a dialkylamino group-containing styrene such as N,N-dimethylaminostyrene or N,N-dimethylaminomethylstyrene, a dialkylamino group-containing acrylic or methacrylic acid ester such as N,N-dimethylaminoethyl methacrylate, N,N-dimethylaminoethyl acrylate, N,N-diethylaminoethyl methacrylate, N,N-diethylaminoethyl acrylate, N,N-dimethylaminopropyl methacrylate, N,N-dimethylaminopropyl acrylate, N,N-diethylaminopropyl methacrylate and N,N-diethylaminopropyl acrylate, a dialkylamino group-containing vinyl ether such as 2-dimethylaminoethyl vinyl ether, or a dialkylamino group-containing acrylamide or methacrylamide such as N-(N',N'-dimethylaminoethyl)methacrylamide, N-(N',N'-dimethylaminoethyl)acrylamide, N-(N',N'-diethylaminoethyl)methacrylamide, N-(N',N'-diethylaminoethyl)acrylamide, N-(N',N'-dimethylaminopropyl)methacrylamide, N-(N',N'-dimethylaminopropyl)acrylamide, N-(N',N'-diethylaminopropyl)methacrylamide or N-(N',N'-diethylaminopropyl)acrylamide is copolymerized with a lipophilic, ethylenically unsaturated monomer as described above according to a known process, and the obtained polymer is quaternized by a known quaternizing agent, for example, an alkyl halide (the alkyl group having 1 to 18 carbon atoms and the halogen being selected from among chlorine, bromine and iodine), a benzyl halide such as benzyl chloride or benzyl bromide, an alkyl ester (the alkyl group having 1 to 18 carbon atoms) of an alkyl- or arylsulfonic acid such as methanesulfonic acid, benzenesulfonic acid or toluenesulfonic acid, or a dialkyl sulfate (the alkyl group having 1 to 4 carbon atoms).

(b) A halomethyl group-containing polymer such as a copolymer of an ethylenically unsaturated monomer having a halomethyl group ($-CH_2X$), such as chloromethylstyrene, 3-chloro-1-propene, 3-bromo-1-propene, 2-chloroethyl acrylate, 2-chloroethyl methacrylate, 2-bromoethyl acrylate, 2-bromoethyl methacrylate, 3-chloropropyl acrylate, 3-chloropropyl methacrylate, 3-bromopropyl acrylate, 3-bromopropyl methacrylate, 4-chloropropyl acrylate, 4-chloropropyl methacrylate or 2-chloroethyl vinyl ether, with a lipophilic, ethylenically unsaturated monomer as described above, or a chloromethylation product of polystyrene or a copolymer of styrene with other lipophilic, ethylenically unsaturated monomer is reacted with an aliphatic tertiary amine such as trimethylamine, triethylamine, tripropylamine, tributylamine, triamylamine, n-octyldimethylamine, n-dodecyldimethylamine or n-tetradecyldimethylamine, or an aromatic amine such as dimethylaniline, diethylaniline or tribenzylamine.

(c) A copolymer of an epoxy group-containing, ethylenically unsaturated monomer such as glycidyl (meth)acrylate, vinylphenyl glycidyl ether, vinylphenylethylene oxide or allyl glycidyl ether with a lipophilic, ethylenically unsaturated monomer as described above is reacted with a secondary amine to open the epoxy ring and introduce a tertiary amino group and then quaternization of the tertiary amino group is carried out in the same manner as described in item (a) above.

(d) A hydroxyl group-containing polymer such as a copolymer of a hydroxyl group-containing, ethylenically unsaturated monomer such as 2-hydroxyethyl acrylate, 2-hydroxyethyl methacrylate, 2-hydroxypropyl acrylate, 2-hydroxypropyl methacrylate or N-2-hydroxyethylacrylamide with a lipophilic, ethylenically unsaturated monomer as described above or a saponification product of a copolymer of a lipophilic, ethylenically unsaturated monomer as described above with a fatty acid ester of vinyl alcohol is reacted with a cationic agent such as glycidyltrimethylammonium chloride or 3-chloro-2-hydroxypropyltrimethylammonium salt.

(e) A cationic group-containing, ethylenically unsaturated monomer obtained by quaternizing a tertiary amino group-containing, ethylenically unsaturated monomer as described in item (a) above with a quaternizing agent as described in item (a) above or reacting a chloromethyl group-containing, ethylenically unsaturated monomer as described in item (b) above with an aliphatic tertiary amine or aromatic amine as described in item (b) above is copolymerized with a lipophilic, ethylenically unsaturated monomer as described above.

In order to form the dispersant of the present invention, it is necessary to maintain a good hydrophilic-lipophilic balance. The kinds and contents of the units of the lipophilic, ethylenically unsaturated monomer and cationic group-containing, ethylenically unsaturated monomer used and the molecular weight of the polymer are appropriately determined according to the kind of the water-soluble, ethylenically unsaturated monomer to be polymerized so that the polymerization is adequately advanced. Ordinarily, there is preferably used a polymer comprising 70 to 99 mole % of the units of the lipophilic, ethylenically unsaturated monomer and 1 to 30 mole % of the units of the cationic group-containing, ethylenically unsaturated monomer and having a molecular weight of 500 to 500,000. If the content of the cationic group-containing, ethylenically unsaturated monomer is more than 30 mole percent, compatibility of the polymer with an organic solvent gets insufficient. The dispersion stabilization effect is not provided.

In case of a polymer having a molecular weight lower than 500 or higher than 500,000, no satisfactory dispersion stabilizing effect can be obtained even if a good hydrophilic-lipophilic balance is maintained.

In the water-in-oil suspension for polymerization an amount of the dispersant of the invention is from 0.01 to 20%, preferably 0.05 to 10%, by weight, based on the total weight of the monomers used for polymerization. Within the range, a smaller amount is preferable.

As a water-soluble, ethylenically unsaturated monomer to polymerize in the water-in-oil suspension using the invention dispersant, any monomer to be dissolved in water at an optional ratio may be employed. For example, there can be mentioned alkali metal salts, ammonium salts and amine salts of acrylic acid and methacrylic acid, acrylamide, methacrylamide, water-soluble N-substituted acrylamides and methacrylamides, vinylimidazole, vinylpyridine, vinylpyrrolidone, and alkali metal salts of sulfonated styrene and vinylsulfonic acid. Such a monomer is used in a state dissolved in water, and ordinarily, an aqueous solution of the monomer having a concentration close to the saturation concentration is used.

The dispersant of the present invention is used for homopolymerization of these monomers or copolymerization of two or more of them.

As the solvent, there can be used aromatic and aliphatic non-polar solvents which do not dissolve in water. For example, there can be mentioned benzene, toluene, xylene, heptane, hexane, cyclohexane and petroleum ether.

A known polymerization initiator and a known promoter can be used. For example, as the initiator, there can be mentioned hydrogen peroxide, potassium persulfate, ammonium persulfate, sodium peroxide, t-butyl hydroperoxide, azobisisobutyronitrile and azobis-2,4-dimethyl-valeronitrile. As a promoter, there can be mentioned sodium hydrogensulfite, sodium thiosulfate and ferrous ammonium sulfate.

The suspension polymerization using the dispersant of the present invention is carried out in the same manner as in the conventional processes. The polymer of the present invention can be a good dispersant even if it is used singly, but other emulsifier or dispersant may be used in combination with the polymer of the present invention according to need.

EXAMPLES

The present invention will now be described in detail with reference to the following examples that by no means limit the scope of the invention.

SYNTHESIS EXAMPLE 1

A mixture comprising 10.0 g of a styrene/dimethylaminoethyl methacrylate copolymer (having a dimethylaminoethyl methacrylate content of 7.7 mole % and a number-average molecular weight of 7,800), 5.0 g of butyl bromide and 50 g of tetrahydrofuran was refluxed for 8 hours. By removing the volatile components by distillation under reduced pressure, there was obtained 11.0 g of a dispersant (1) having a cationic group

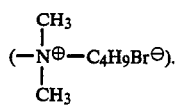

SYNTHESIS EXAMPLE 2

A mixture comprising 20.0 g of the styrene/dimethylaminoethyl methacrylate copolymer described in Synthesis Example 1, 10.0 g of octyl bromide and 50 g of tetrahydrofuran was refluxed for 10 hours. The reaction mixture was poured into 1,000 g of methanol, and the precipitated insoluble solid was recovered by filtration, washed with methanol and dried under reduced pressure to obtain 15.6 g of a dispersant (2) having a cationic group

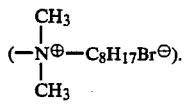

SYNTHESIS EXAMPLE 3

A mixture comprising 10.0 g of a styrene/chloromethylstyrene copolymer (having a chloromethylstyrene content of 2.0 mole % and a number-average molecular weight of 10,000), 5.0 g of triethylamine and 50 g of tetrahydrofuran was refluxed for 9 hours. The post-treatment was conducted in the same manner as described in Synthesis Example 2 to obtain 8.7 g of a dispersant (3) having a cationic group

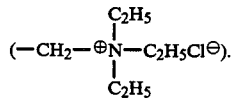

SYNTHESIS EXAMPLE 4

A mixture comprising 10.0 g of the styrene/chloromethylstyrene copolymer described in Synthesis Example 3, 5.0 g of dimethyloctylamine and 50 g of tetrahydrofuran was refluxed for 9 hours. The post-treatment was carried out in the same manner as described in Synthesis Example 2 to obtain 7.0 g of a dispersant (4) having a cationic group

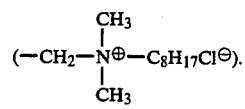

SYNTHESIS EXAMPLE 5

A mixture comprising 10 g of a benzyl methacrylate/dimethylaminoethyl methacrylate copolymer (having a dimethylaminoethyl methacrylate content of 4.4 mole % and a number-average molecular weight of 4,300), 5.0 g of octyl bromide and 50 g of tetrahydrofuran was refluxed for 9 hours, and the post-treatment was carried out in the same manner as described in Synthesis Example 2 to obtain a dispersant (5) having a cationic group

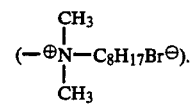

EXAMPLE 1

A flask having a capacity of 500 ml was charged with 127.5 g of a 80 wt. % aqueous solution of acrylic acid and 141.8 g of a 30 wt. % aqueous solution of caustic soda was dropped under cooling with stirring to neutralize 75 mole % of acrylic acid. Then, a solution of 0.30 g of potassium persulfate in 12.5 g of deionized water was added.

A 1-l flask equipped with a stirrer, a reflux condenser and a dropping funnel, in advance charged with nitrogen gas, was provided with 312.5 g of cyclohexane and 1.5 g of the dispersant (1). The mixture was heated while stirred at a rate of about 350 rpm until the cyclohexane had started to reflux mildly. The above prepared aqueous solution of the monomer was added dropwise to the mixture over a period of 30 minutes from the dropping funnel. The reaction mixture was then refluxed, while stirred, for more three hours. The reaction product was filtrated to separate a polymer. The polymer was dried under a reduced pressure. 125 g of a granular white dried polymer was obtained. The polymer was found to have an average particle size of 250 microns.

EXAMPLES 2 THROUGH 5

The procedures of Example 1 were repeated in the same manner except that the dispersants (2) through (5) described in Synthesis Examples 2 through 5 were used instead of the dispersant (1) used in Example 1. The obtained results are shown in Table 1.

TABLE 1

| Example No. | dispersant No. | cationic group | amount (g) | 80% by weight aqueous solution of acrylic acid (g) | 30% by weight aqueous solution of caustic soda (g) | Cyclohexane (g) | Polymer Yield (g) | Polymer Average particle size (μm) |
|---|---|---|---|---|---|---|---|---|
| 2 | (2) | CH₃<br>—N—C₈H₁₇Br⁻<br>⊕<br>CH₃ | 1.5 | 127.5 | 141.8 | 312.5 | 124.5 | 250 |

TABLE 1-continued

| Example No. | dispersant No. | dispersant cationic group | amount (g) | 80% by weight aqueous solution of acrylic acid (g) | 30% by weight aqueous solution of caustic soda (g) | Cyclo-hexane (g) | Polymer Yield (g) | Polymer Average particle size (μm) |
|---|---|---|---|---|---|---|---|---|
| 3 | (3) | $-\overset{\text{Et}}{\underset{\text{Et}}{\text{N}}}-\overset{\oplus}{\text{Et}}\text{Cl}^{\ominus}$ | 1.5 | 127.5 | 141.8 | 312.5 | 125.0 | 255 |
| 4 | (4) | $-\overset{\text{CH}_3}{\underset{\text{CH}_3}{\text{N}}}-\overset{\oplus}{\text{C}_8\text{H}_{17}}\text{Cl}^{\ominus}$ | 1.5 | 127.5 | 141.8 | 312.5 | 125.0 | 260 |
| 5 | (5) | $-\overset{\text{CH}_3}{\underset{\text{CH}_3}{\text{N}}}-\overset{\oplus}{\text{C}_8\text{H}_{17}}\text{Br}^{\ominus}$ | 1.5 | 127.5 | 141.8 | 312.5 | 124.4 | 260 |

COMPARATIVE EXAMPLE 1

The procedures of Example 1 were repeated in the same manner except that 1.5 g of the styrene/dimethylaminoethyl methacrylate used in Synthesis Example 1 was used instead of the dispersant (1) used in Example 1. When 60 g of the monomer solution was dropped, a bulk of the polymer was precipitated and stirring became impossible. From this result, it is seen that a high effect can be attained by introduction of a cationic group.

COMPARATIVE EXAMPLE 2

The procedures of Example 1 were repeated in the same manner except that 5.0 g of sorbitan monolaurate was used instead of the dispersant (1) used in Example 1, whereby 120 g of a granular polymer was obtained. The average particle size of the obtained polymer was as small as 50 μm.

COMPARATIVE EXAMPLE 3

The procedures of Example 1 were repeated in the same manner except that 1.5 g of ethyl cellulose (N-100 supplied by Hercules Co.) was used instead of the dispersant (1) used in Example 1, whereby 115.0 g of a granular polymer was obtained. The average particle size of the obtained polymer was 50 μm. It was found that 8.0 g of the polymer adhered to the inner wall of the flask and the stirring rod, and the amount of the obtained polymer was smaller than those of Examples 1 through 5.

The embodiments of the invention in which an exclusive privilege or property is claimed are defined as follows:

1. A process for preparing a polymer by water-in-oil suspension polymerization, which comprises:
    preparing an oil composition comprised of a water-insoluble, non-polar, organic solvent and a dispersant polymer, said dispersant polymer consisting esentially of from 70 to 99 mole percent of lipophilic, ethylenically unsaturated monomer units and from 1 to 30 mole percent of ethylenically unsaturated monomer units having a cationic group,
    separately preparing an aqueous solution of a polymerization initiator and at least one water-soluble, ethylenically unsaturated monomer,
    and then mixing said aqueous solution with said oil composition and maintaining the mixture thereof under water-in-oil suspension polymerization conditions effective to polymerize said water-soluble, ethylenically unsaturated monomer.

2. A process as claimed in claim 1, in which said dispersant polymer has a number-average molecular weight of 500 to 500,000.

3. A process as claimed in claim 1, in which said cationic group has the formula:

$$-\overset{R_1}{\underset{R_3}{N^{\oplus}}}-R_2\ Y^{\ominus},$$

in which R1, R2 and R3, being the same as or different form each other, are each an alkyl group, either unsaturated or saturated, having 1 to 18 carbon atoms, or two of R1, R2 and R3 form a ring structure together with the adjacent nitrogen atom; and Y is a halogen atom or an acid residue.

4. A process as claimed in claim 1, in which said lipophilic, ethylenically unsaturated monomer units are units selected from the group consisting of styrene, alkyl styrene in which the alkyl has from 1 to 18 carbon atoms, alkyl acrylates and alkyl methacrylates in which the alkyl has from 1 to 18 carbon atoms, aliphatic esters of vinyl alcohol in which the ester-forming moiety has from 2 to 18 carbon atoms, and N-alkyl acrylamides and N-alkylmethacrylamides in which the alkyl has 1 to 18 carbon atoms.

5. A process as claimed in claim 1, in which said dispersant polymer is used in an amount of 0.01 to 20 percent by weight based on the total weight of said water-soluble, ethylenically unsaturated monomer.

6. In a water-in-oil suspension polymerization process wherein an aqueous solution of at least one water-soluble, ethylenically unsaturated monomer is added to an oil phase containing a dispersion stabilizer, and said monomer is polymerized under water-in-oil suspension polymerization conditions, the improvement which comprises: said dispersion stabilizer is a polymer consisting essentially of from 70 to 99 mole percent of lipophilic, ethylenically unsaturated monomer units and from 1 to 30 mole percent of ethylenically unsaturated monomer units having a cationic group.

7. A process as claimed in claim 1 in which said water-soluble, ethylenically unsaturated monomer is selected from the group consisting of the alkali metal, ammonium and amine salts of acrylic acid and methacrylic acid, acrylamide, methacrylamide, water-soluble N-substituted acrylamides and methacrylamides, vinylimidazole, vinyl pyridine, vinyl pyrrolidone, alkali metal salts of sulfonated styrene and vinylsulfonic acid, and mixtures thereof.

* * * * *